(12) United States Patent
Usui et al.

(10) Patent No.: US 6,597,532 B1
(45) Date of Patent: Jul. 22, 2003

(54) INFORMATION RECORDING DISK APPARATUS

(75) Inventors: Kazuaki Usui, Chiyoda (JP); Keiko Watanabe, Tsuchiura (JP); Kei Yasuna, Chiyoda (JP); Tetsuya Hamaguchi, Chiyoda (JP); Tsuyoshi Arai, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/580,954

(22) Filed: May 30, 2000

(30) Foreign Application Priority Data

Jun. 30, 1999 (JP) .......................................... 11-184775

(51) Int. Cl.$^7$ ................................................ G11B 33/14
(52) U.S. Cl. ................................................ 360/97.03
(58) Field of Search ........................ 360/97.01, 97.02, 360/97.03

(56) References Cited

U.S. PATENT DOCUMENTS 5,757,580 A * 5/1998 Andress et al. ............ 360/97.02

FOREIGN PATENT DOCUMENTS

WO WO-94/22135 * 9/1994

* cited by examiner

Primary Examiner—David Davis
(74) Attorney, Agent, or Firm—Antonelli, Terry, Stout & Kraus, LLP (57) ABSTRACT

An acceleration detecting apparatus for a magnetic disk apparatus capable of detecting with high reliability the disturbances such as rotational and translational shocks and vibrations applied externally to the magnetic disk apparatus to thereby prevent destruction or the like damages of data recorded on a disk of the magnetic disk apparatus upon occurrence of off-track event under the influence of the disturbance. The apparatus includes a pair of acceleration detectors for detecting acceleration in two directions extending discretely in parallel to each other. The acceleration detectors are disposed at positions closer to the magnetic disk relative to a pivot shaft for a head supporting arm as viewed in a longitudinal direction of an oblong box-like casing of the magnetic disk apparatus in a plane which forms an angle not greater than 10 degrees relative to the plane of the magnetic disk. By employing the angular acceleration detectors in combination with an angular velocity detector, the rotational disturbances due to rotational shock/vibration can be detected with much enhanced reliability, and destruction of the data recorded on the magnetic disk due to the off-track read/write operation can positively be prevented.

8 Claims, 8 Drawing Sheets

INFORMATION RECORDING DISK APPARATUS

BACKGROUND OF THE INVENTION

The present invention relates generally to an information/data recording disk apparatus such as a magnetic disk apparatus, CD-R (compact disk recordable), DVD (digital versatile disk) and the like disk apparatus. More specifically, the invention is concerned with an apparatus for detecting shocks, vibrations and the like applied to the disk apparatus to thereby prevent erroneous operations thereof which may be brought about by such unwanted phenomena.

In recent years, the disk apparatus such as magnetic disk apparatus is increasingly employed in various machines, apparatuses and/or equipment such as, for example, portable-type computer and others, being accompanied with a trend of the magnetic disk apparatus being implemented in a thin and small-sized structure. In the portable-type apparatuses such as those mentioned above, the magnetic disk apparatus mounted therein is likely to be subjected to shocks and vibrations applied externally. When rotational vibration or rotational shock around an axis perpendicular to a disk surface or plane of a magnetic disk is externally applied to the disk apparatus, then the magnetic head positioning control system of the magnetic disk apparatus will undergo the influence of the angular acceleration brought about by the rotational vibration or rotational shock, which may result in that the position of the magnetic head (or write/read head) is caused to displace or deviate from the center of the track to which the head is positioned by the head positioning control system. This event will hereinafter be referred to as the off-track event or simply as the off-track. Further, when translational vibration or translational shock is externally applied to the magnetic disk apparatus, the translational acceleration is translated into angular acceleration due to mass unbalance of the head supporting arm assembly, as a result of which the off-track event of the magnetic head is brought about. As can readily be understood, such off-track event may involve destruction of data recorded on the disk, degradation of the performance of the magnetic disk apparatus, etc. In this conjunction, a great difficulty will be encountered in controlling the magnetic head such that it can follow the target track perfectly notwithstanding of the disturbance of angular acceleration applied externally due to irregular shocks, vibrations and/or the like.

Under the circumstances, an attempt of coping with the above-mentioned problem has been developed and disclosed in Japanese Unexamined Patent Application Publication No. 45024/1997 (JP-A-9-45024). More specifically, disclosed in this publication is a method of detecting shocks and vibrations in a plane parallel to that of the magnetic disk with the aid of three acceleration detecting sensors, i.e., two acceleration sensors dedicated for detection of the acceleration in two directions extending discretely in parallel to each other in a plane substantially parallel to that of the magnetic disk and the sensor for detecting acceleration in one direction which is not in parallel with the two directions mentioned just above, wherein the three acceleration sensors are mounted on a box-like housing or casing of the magnetic disk apparatus or a circuit board such as a printed circuit board which is mounted internally of the box-like casing. Incidentally, in the magnetic disk apparatus disclosed in the above-mentioned publication, the acceleration sensors are disposed along side walls, respectively, of the box-like casing or the circuit board.

With a scheme for detecting the acceleration by using a single sensor, only the translational acceleration can be detected by that sensor. More specifically, as to the angular acceleration, the sensor detects the translational acceleration which is brought about by the angular acceleration in the vicinity of the sensor. Accordingly, in the case where the center of rotation for the angular acceleration exists in the vicinity of a straight line representing the sensing direction of the sensor, the acceleration is too low for the sensor to detect it. In other words, the angular acceleration for which the center of rotation lies close to the sensor can not be detected by that sensor. On the contrary, in the case of the angular acceleration for which the center of rotation exists at a position distanced sufficiently from the straight line representing the sensing direction of the sensor, the translational acceleration can be detected by the sensor with sufficiently high sensitivity. In this conjunction, it is noted that the angular accelerations acting on the magnetic disk apparatus in the state mounted, for example, in a portable computer may have a variety of positions in respect to the center of rotations thereof, as a result of which the acceleration detection output of the sensor may vary remarkably for a same angular acceleration. Such being the circumstances, great difficulty is encountered in actual applications in setting a threshold value or level for allowing a write operation disabling or inhibiting signal to be generated upon occurrence of the off-track event in response to the output of the single acceleration sensor.

In this conjunction, it is disclosed in JP-A-9-45024 mentioned above that difference between the outputs of two sensors which are so disposed as to detect the acceleration in the directions extending discretely in parallel to each other is used for detecting the angular acceleration. Theoretically, the angular acceleration must be detected with such arrangement. However, the sensors employed for detecting the accelerations in practical applications suffer remarkable dispersion or deviation in respect to the detection sensitivity due to intrinsic differences inherent to the individual sensors, environmental conditions and the secular change. By way of example, it is known that the acceleration detecting sensors known heretofore have dispersion of about 20%. Consequently, even if the acceleration detecting sensors are so disposed as to detect the acceleration in the two directions extending discretely in parallel to each other, it is difficult to detect only the angular acceleration due to the dispersions of the detection sensitivity between the sensors, incurring the problem that the translational acceleration may erroneously be detected as the angular acceleration.

Furthermore, the sensor output is easily susceptible to the influences of noises such as power source noise and the like. Accordingly, disposition of the two acceleration sensors on the side walls, respectively, of a circuit board which extend in parallel with each other, as disclosed in JP-A-9-45024, will be accompanied with such a problem that the sensor output contains lots of noise because of a large distance intervening between the sensors and the circuit for processing the sensor outputs, making it difficult to detect the angular acceleration with high sensitivity and reliability.

In practical applications, it has been found that the translational acceleration in the direction perpendicular to the plane of the disk brings about lesser off-track displacement of the read/write head when compared with that bought about by the translational acceleration in a plane parallel to that of the disk. Accordingly, in case the threshold value for allowing the write operation disabling signal to be generated through comparison is set for the translational acceleration of the perpendicular direction, the detection sensitivity will become lowered in the direction parallel to the disk plane, which may lead to occurrence of the off-track event and hence to the data destruction, giving rise to a serious problem. On the contrary, when the threshold level mentioned above is set in consideration of the translational acceleration in the plane parallel to the disk plane, such translational acceleration of perpendicular direction which can inherently irrelevant to the data destruction will be detected as well, as a result of which the write operation inhibit signal is unnecessarily produced, involving degradation of the operation performance of the magnetic disk apparatus. In brief, compatibility between security of the operation performance and protection of the data is difficult to realize.

It should additionally be mentioned that in the small type magnetic disk apparatus for the portable equipment in the current state of the art, difficulty will also be encountered in disposing the sensor in a region extending from a pivot shaft to a voice coil motor from the standpoint of implementation of the thin and small-sized magnetic disk apparatus.

SUMMARY OF THE INVENTION

In the light of the state of the art described above, it is an object of the present invention to provide an information recording disk apparatus destined to be mounted in a portable equipment, which apparatus is equipped with facilities for preventing occurrence of the off-track event due to disturbance to thereby protect positively data from destruction and assure read/write operations with high accuracy and reliability.

Another object of the present invention is to provide a magnetic disk apparatus destined to be mounted in a portable equipment such as a small-size computer, which apparatus is capable of preventing occurrence of the off-track event due to disturbance, protecting positively data from destruction and assuring read/write operations with high accuracy and reliability.

In view of the above and other objects which will become apparent as the description proceeds, there is provided according to an aspect of the present invention a magnetic disk apparatus which includes at least a magnetic disk for recording information, at least a magnetic head for writing/reading the information on/from the magnetic disk, a head supporting arm assembly for supporting the magnetic head, a pivot shaft for supporting pivotally the head supporting arm assembly, an actuator for driving the head supporting arm assembly, and at least a pair of acceleration detectors for detecting acceleration in two directions extending discretely in parallel to each other, wherein the pair of acceleration detectors are disposed on the box-like casing or alternatively a circuit board mounted internally of the box-like casing of the magnetic disk apparatus at positions closer to the magnetic disk relative to the pivot shaft as viewed in a longitudinal direction of a box-like casing of the magnetic disk.

In a preferred mode for carrying out the present invention, the magnetic disk apparatus may be so arranged that the distance between straight lines indicating direction of the acceleration detected by the two acceleration detectors, respectively, is not less than 10% and not more than 80% of a longitudinal length of a box-like casing of the magnetic disk apparatus.

In another preferred mode for carrying out the present invention, the acceleration detector for detecting acceleration in a plane which forms an angle of not greater than 10 degrees relative to a plane extending in parallel to the plane of the magnetic disk may be mounted on a box-like casing or a circuit board which is mounted internally of the box-like casing of the magnetic disk apparatus.

In yet another preferred mode for carrying out the present invention, the magnetic disk apparatus may be so arranged that a sensor or detector for detecting an angular velocity around an axis perpendicular to a plane of the disk and an acceleration detector for detecting acceleration in a plane direction which forms an angle of not greater than 10 degrees relative to the plane of the magnetic disk are mounted on the box-like casing of the magnetic disk apparatus or alternatively on the circuit board which is mounted internally of the box-like casing of the magnetic disk apparatus.

In still another preferred mode for carrying out the present invention, the magnetic disk apparatus may be so arranged that an acceleration detector for detecting an angular velocity around an axis perpendicular to a plane of the magnetic disk and acceleration detectors for detecting accelerations, respectively, in the two directions which are parallel and do not coincide with each other in a plane which forms an angle of not greater than 10 degrees relative to the plane of the magnetic disk or alternatively one IC chip incorporating the two acceleration detectors mentioned just above are mounted on the box-like casing of the magnetic disk apparatus or the circuit board mounted internally of the box-like casing thereof.

By virtue of the arrangements described above, the angular acceleration applied to the box-like casing can positively be detected with at least two acceleration detectors disposed in parallel to each other. Besides, the magnetic disk apparatus can be realized in a small-sized structure.

Further, even when dispersion is found between the two acceleration detectors at the least which are disposed in parallel with each other, the angular acceleration applied to the box-like casing of the magnetic disk apparatus can be detected with an enhanced sensitivity.

Furthermore, the acceleration on the order of 10G applied to the box-like casing in the direction perpendicular to the plane of the disk as well as the acceleration and the angular acceleration appearing in a plane parallel to the disk plane under the influence of deformation of the circuit board on which the acceleration detectors are mounted can be detected with an improved sensitivity.

Besides, the rotational shock/vibration of very small magnitude applied to the box-like casing which could not be detected heretofore with two acceleration detectors having different sensitivities and disposed in parallel to each other can be detected with high sensitivity with the acceleration detecting arrangement incorporated in the magnetic disk apparatus according to the present invention.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE EMBODIMENTS

The present invention will now be described in detail in conjunction with what is presently considered as preferred or typical embodiments thereof by reference to the drawings. In the following description, like reference characters designate like or corresponding parts throughout the several views. Further, the following description will be made, only by way of example, on the assumption that the present invention is applied to a magnetic disk apparatus, being understood however that the invention can equally find application to other types of information/data recording apparatus such as, for example, CD-R (compact disk recordable), DVD (digital versatile disk) and the like disk apparatus.

Embodiment 1

Figure 1A:
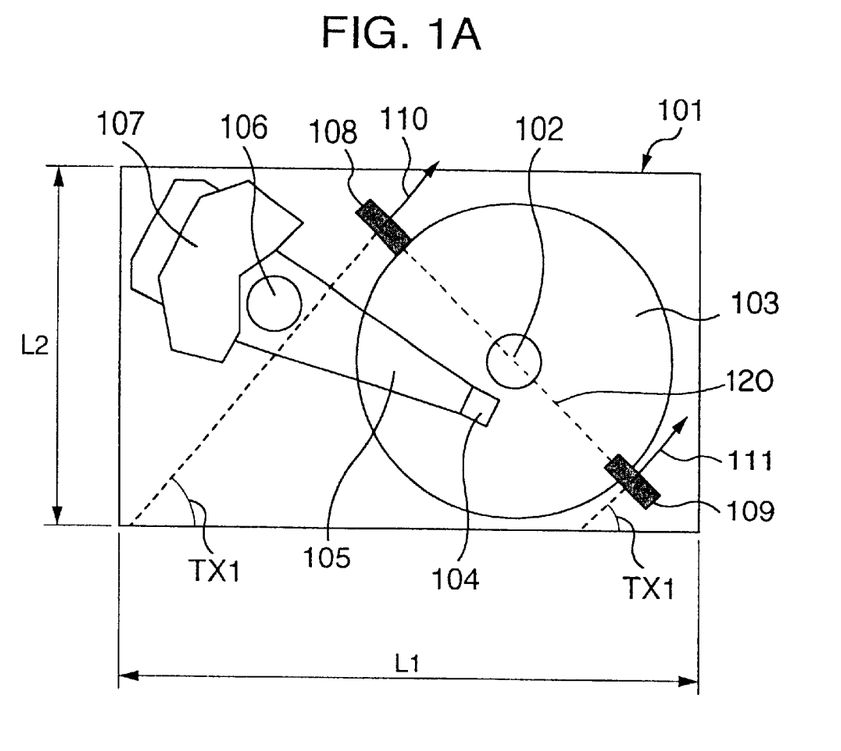
FIG. 1A is a top plan view showing schematically a structure of a magnetic disk apparatus according to an embodiment of the present invention.
Figure 1B:
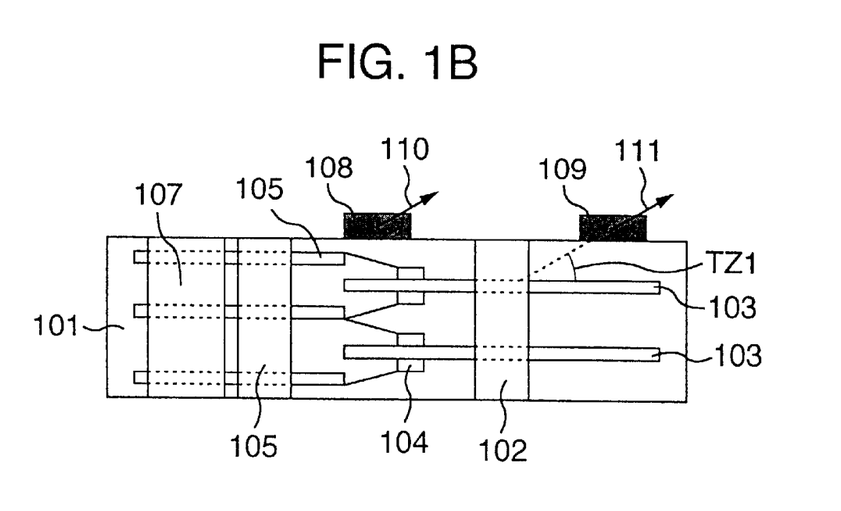
FIG. 1B is a side elevational view showing schematically a structure of the same.

Referring to FIGS. 1A and 1B which show schematically a structure of a magnetic disk apparatus according to an embodiment of the present invention in a top plan view and a side elevational view, respectively, reference numeral 101 denotes generally a rectangular or oblong box-like housing or casing of the magnetic disk apparatus within which a spindle motor 102 is mounted fixedly. The spindle motor 102 includes a shaft driven rotatively thereby, wherein magnetic disks 103 (two magnetic disks in the case of the illustrated embodiment of the invention) are mounted on the shaft of the spindle motor 102 for corotation therewith. For writing or reading information on or from the magnetic disk 103, magnetic heads 104 are provided in contacting or noncontacting state movably relative to the surfaces of the magnetic disk 103. Parenthetically, in the case of the illustrated embodiment of the magnetic disk apparatus, a pair of magnetic heads 104 are provided in association with each of the magnetic disks 103 and thus four magnetic heads 104 in total, as can be seen in FIG. 1B. Each of the magnetic heads 104 is supported by a head supporting arm assembly 105 which in turn is supported pivotally by means of a pivot shaft 106 of a voice coil motor 107. Thus, the head supporting arm assembly 105 is caused to move rotatively or swing in response to electrical energization of the voice coil motor 107, whereby the magnetic head 104 is caused to move radially inwardly or outwardly relative to the magnetic disk 103, i.e., in the direction from the outer periphery of magnetic disk 103 to the inner periphery thereof or in the reverse direction. Thus, information or data recorded on a track(s) of the magnetic disk 103 can be read by the magnetic head 104 or information/data can be written on the magnetic disk.

Figure 3:
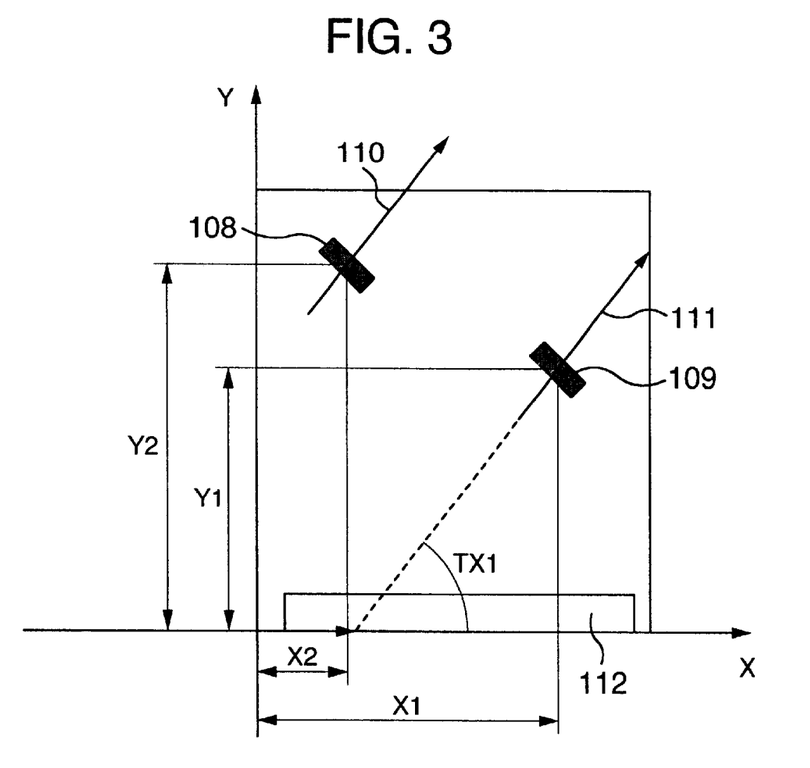
FIG. 3 is a diagram for illustrating positional orientation of the shock sensors.

In the magnetic disk apparatus according to the instant embodiment of the invention, a pair of acceleration detectors 108 and 109 are mounted on a top wall of the box-like casing 101, as can be seen in FIG. 1B. More specifically, the acceleration detector 109 is mounted fixedly on the outer surface of the top wall of the oblong box-like casing 101 at such a position that an angle TZ1 formed between a line interconnecting this position and the position at which the magnetic disk is mounted on the spindle shaft (see an arrow 111 shown in FIG. 1B) on one hand and a plane of the magnetic disk 103 on the other hand is smaller than 10 degrees inclusive. See FIG. 1B. The other acceleration detector 108 is also mounted on the top wall surface of the oblong box-like casing 101 in parallel to the acceleration detector 109. Additionally, the acceleration detectors 109 and 108 are disposed in such orientation that acceleration can be detected by the acceleration detectors 109 and 108 in two discrete directions indicated by arrows 110 and 111, each of which extends at an angle TX1 (which lies within a range of 15 to 75 degrees inclusive) relative to a side wall of the rectangular box-like casing 101 in a plane extending parallel to that of the magnetic disk 103. See FIG. 1A and FIG. 3. In FIG. 3, the direction on which connectors 122 are arranged is designated as X direction, and the direction perpendicular to the X direction is designated as Y direction. As shown in FIG. 1A, the acceleration detectors 109 and 108 are arranged so that a rotation center of the disk 103 is disposed therebetween and the acceleration detectors 109 and 108 lie on a line (dashed line 120) which extends through the rotation center and is perpendicular to a rotation axis of the disk 103 as represented by the shaft of the spindle motor 102.

Figure 2:
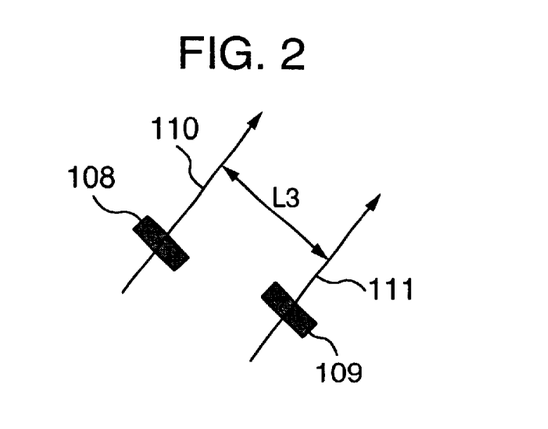
FIG. 2 is a schematic view for illustrating disposition of a pair of shock sensors in the magnetic disk apparatus according to an embodiment of the present invention.

In conjunction with disposition of the acceleration detectors 108 and 109, it should further be mentioned that a distance L3 intervening between these detectors 108 and 109 is so selected as to lie within a range of 10 to 80% of a length L1 of the oblong or rectangular box-like casing 101 as viewed in the longitudinal direction thereof, as can be seen in FIG. 2. Incidentally, the following description will be made on the assumption that as the acceleration detector, a so-called shock sensor is employed, only for convenience of the description.

Figure 5:
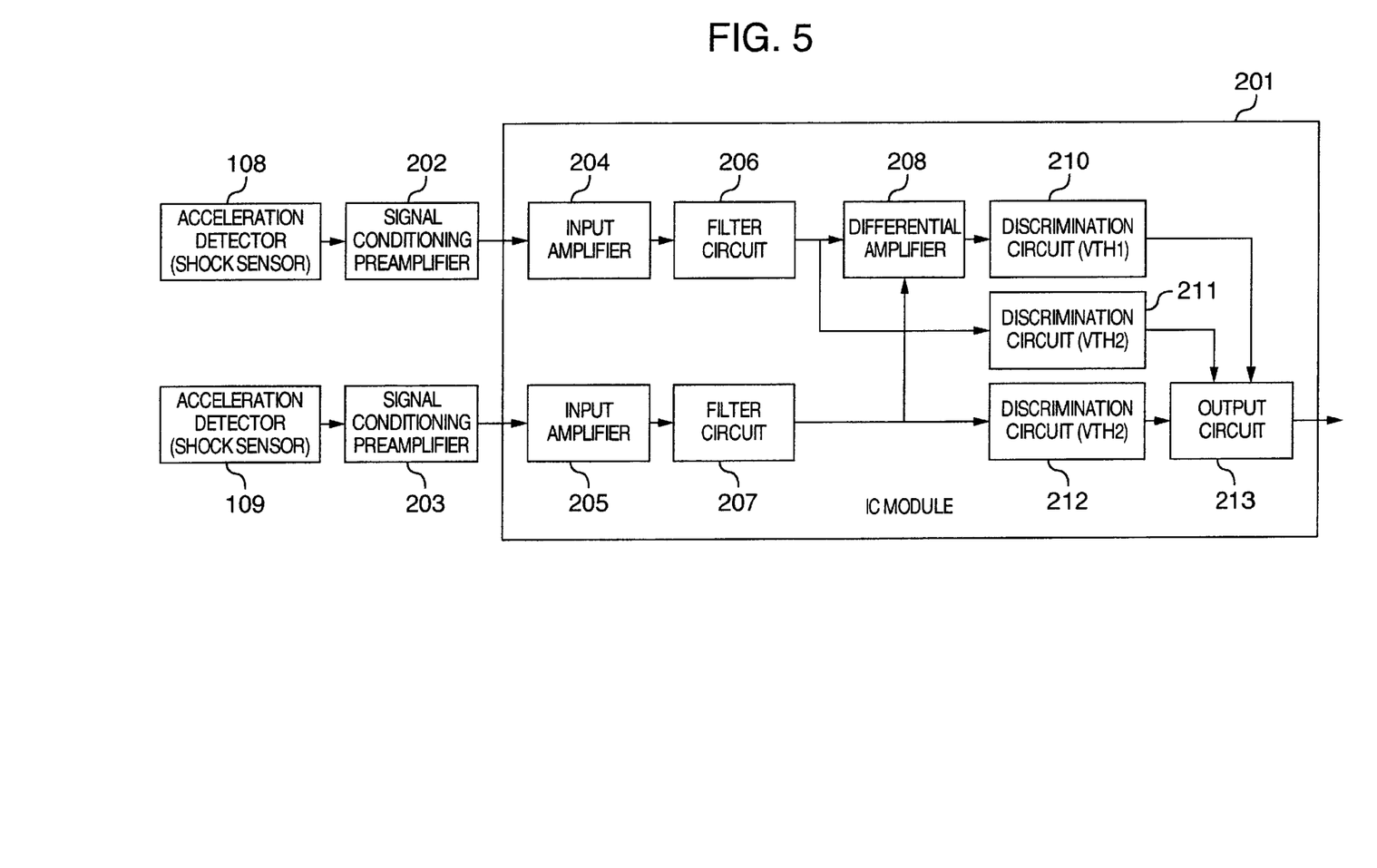
FIG. 5 is a block diagram showing schematically an arrangement of a sensor output processing circuit according to an embodiment of the present invention.

Next, description will be directed to an electric circuit for processing the output signals of the shock sensors 108 and 109 by reference to FIG. 5 which shows schematically in a block diagram an arrangement of the sensor output processing circuit according to an embodiment of the present invention. In the description which follows, it is assumed, only by way of example, that the sensor output processing circuit is implemented at least partially in the form of an integrated circuit module.

Figure 6:
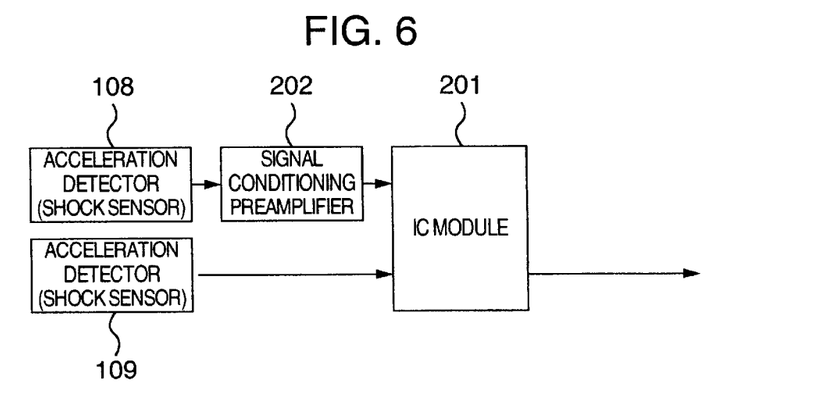
FIG. 6 is a block diagram showing schematically a modification of the circuit configuration shown in FIG. 5.

Referring to FIG. 5, reference numeral 108 and 109 denote, respectively, the acceleration detectors mentioned hereinbefore, which will hereinafter be referred to as the shock sensors, since it is presumed that these acceleration detectors are implemented as the shock sensors, respectively, as mentioned above. The output signals of the shock sensors 108 and 109 are supplied to an integrated circuit module 201 after having been amplified by signal conditioning preamplifiers 202 and 203, respectively. The integrated circuit module will hereinafter be referred to also as the IC module. At this juncture, it should be mentioned that one of the signal conditioning preamplifiers 202 and 203, e.g. the signal conditioning preamplifier 202 associated with the shock sensor 109, may be spared in the case when the shock sensor 109 is disposed in proximity to the IC module 201 as compared with the shock sensor 108, as can be seen from FIG. 6 which shows a modification of the sensor signal processing circuit shown in FIG. 5. Of course, both the signal conditioning preamplifiers 202 and 203 may be spared as the case may be. The IC module 201 is comprised of input amplifiers 204 and 205, filter circuits 206 and 207, a differential amplifier 208, discrimination circuits 210, 211 and 212 and an output circuit 213. The input amplifiers 204 and 205 are designed to amplify the output signals of the signal conditioning preamplifiers 202 and 203 or alternatively those of the shock sensors 108 and 109 (in case the signal conditioning preamplifiers 202 and 203 are spared), respectively, so that the acceleration sensitivities of the sensor circuits constituted by the shock sensors 108 and 109 inclusive of the signal conditioning preamplifiers 202 and 203, if provided, are equal to each other. In other words, the amplification factors of the input amplifiers 204 and 205 are adjustable and so selected that dispersion of the detection sensitivities of the shock sensors 108 and 109 as well as the dispersion of the amplification factors of the signal conditioning preamplifiers 202 and 203 can correctively be canceled out. The sensor output signals amplified by the input amplifiers 204 and 205 are supplied to the filter circuits 206 and 207 (each of which may include a notch filter, a high-pass filter, a low-pass filter and/or a band-pass filter), whereby noise components as well as offsets of direct current or DC components are eliminated from the sensor output signals by the filter circuits 206 and 207, respectively.

At this juncture, it is to be mentioned that the signal conditioning preamplifiers 202 and 203 and/or the input amplifiers 204 and 205 may intrinsically exhibit some filter characteristics such as high-pass filter characteristics or the like. Accordingly, in practical applications, the characteristics of the filter circuits 206 and 207 should preferably be determined by taking into account the characteristics of the signal conditioning preamplifier 202; 203 and the input amplifier 204; 205. The output signals of the filter circuits 206 and 207 are inputted to the differential amplifier 208 which is designed to detect difference between the output signals of the filter circuits 206 and 207. The difference signal outputted from the differential amplifier 208 is then supplied to the discrimination circuit 210 after having passed through a filter circuit (not shown) such as a high-pass filter or a band-pass filter which has low-frequency component cut-off characteristics. When the absolute level or value of the difference signal exceeds a predetermined threshold value VTH1, the discrimination circuit 210 outputs a signal for inhibiting or stopping the data write operation of the magnetic disk apparatus. On the other hand, the discrimination circuit 211 is designed to produce a write operation inhibit signal when the output of the filter circuit 206 exceeds a predetermined threshold level or value VTH2. Similarly, the discrimination circuit 212 is designed to output a write operation inhibit signal when the output of the filter circuit 207 exceeds the threshold level or value VTH2. The output signals, i.e., write operation inhibit signals, of the discrimination circuits 210, 211 and 212 are inputted to an output circuit 213 which may be constituted by a logical ORing function.

Figure 7:
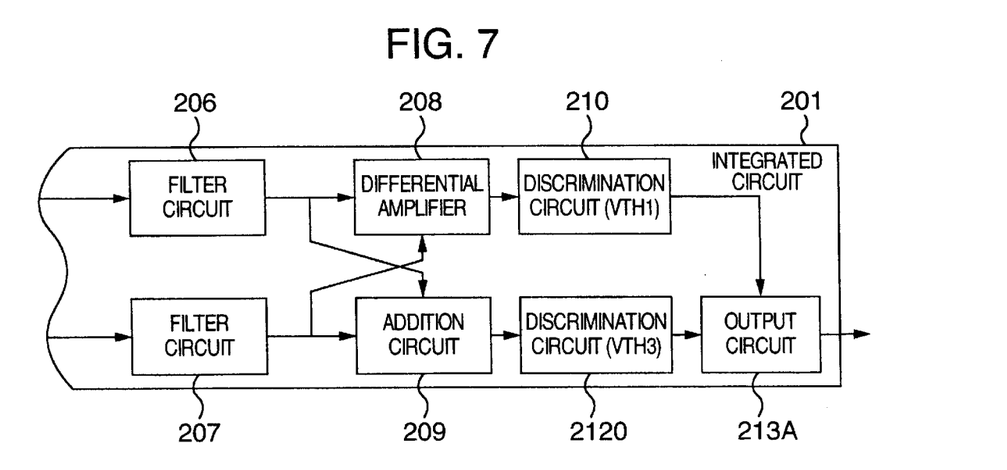
FIG. 7 is a block diagram showing schematically another modification of the circuit configuration shown in FIG. 5.

FIG. 7 shows schematically in a block diagram a circuit configuration of the IC module of the magnetic disk apparatus according to another embodiment of the present invention. The IC module now under consideration includes an addition circuit 209 and a discrimination circuit 2120, wherein the addition circuit 209 is designed to add together the outputs of the filter circuits 206 and 207 to thereby output a sum signal, while the discrimination circuit 2120 is designed to compare the sum signal outputted from the addition circuit 209 with a predetermined threshold value VTH3 to thereby output a write operation inhibit signal when the sum signal outputted from the addition circuit 209 exceeds the threshold value VTH3. Further, in the IC module shown in FIG. 7, the discrimination circuit 210 is designed to compare the difference signal outputted from the differential amplifier 208 with a predetermined threshold level which differs from the threshold value VTH3 set at the discrimination circuit 2120, to thereby output a write operation inhibit signal when the output signal of the differential amplifier 208 exceeds the predetermined threshold level. The output signals of the discrimination circuit 210 and the discrimination circuit 2120 of the IC module shown in FIG. 7 are inputted to an output circuit 213A which may be implemented by using a logical ORing circuit.

As can be seen from the foregoing, in the IC modules shown in FIGS. 5 and 7, the discrimination circuit 210 is designed to compare the difference signal derived from the outputs of the filter circuits 206 and 207 through the differential amplifier 208 with the predetermined threshold level VTH1 to thereby output the write operation inhibit signal when the former reaches or exceeds the latter. On the other hand, the discrimination circuit 211 shown in FIG. 5 compares straightforwardly the output of the filter circuit 206 with the predetermined threshold level VTH2 to thereby output the write operation inhibit signal when the former reaches or exceeds the latter. Further, the discrimination circuit 212 shown in FIG. 5 compares straightforwardly the output of the filter circuit 207 with the predetermined threshold level VTH2 to thereby output the write operation inhibit signal when the former reaches or exceeds the latter. Furthermore, the discrimination circuit 2120 shown in FIG. 7 compares the sum signal outputted from the addition circuit 209 with the predetermined threshold level VTH3 to thereby output the write operation inhibit signal when the sum signal reaches the threshold level VTH3. Needless to say, the threshold levels or values set at the discrimination circuits 210, 211; 212 and 2120, respectively, differ from one another. In this conjunction, it should be mentioned that in place of setting fixedly the threshold levels or values at the individual discrimination circuits, respectively, such arrangement may be adopted that amplifier circuit is provided in precedence to each of the discrimination circuits for allowing the threshold levels of the individual discrimination circuits to be variably set or adjusted by selectively changing the amplification factors of the amplifier circuits, respectively, substantially to the same effect.

The output circuit 213 of the IC module shown in FIG. 5 is designed to output the write operation inhibit signal when logical OR condition is satisfied by the outputs of the discrimination circuits 210, 211 and 212, i.e., when any one of the output signals of these discrimination circuits 210, 211 and 212 indicates the write operation inhibit level. Similarly, the output circuit 213A shown in FIG. 7 is so arranged as to logically ORing the output signals of the discrimination circuits 210 and 2120, whereby an write operation inhibit signal is issued from the IC module 201 when any one of the output signals of the discrimination circuits 210 and 2120 exceeds the relevant threshold level.

Now, description will turn to shock/vibration detecting operation of the magnetic disk apparatus according to the invention.

The accelerations A1 and A2 detected by the two shock sensors 108 and 109, respectively, when translational acceleration and angular acceleration are applied to the oblong or rectangular box-like casing 101 can be given by the following expressions Exp.1 and Exp.2, respectively.

$$A1 = \{AX \cos(TX1) + AY \sin(TX1)\} + RA\{(X1-MX)\sin(TX) - (Y1-MY)\cos(TX1)\} \quad \text{(Exp. 1)}$$

$$A2 = \{AX \cos(TX1) + AY \sin(TX1)\} + RA\{(X2-MX)\sin(TX1) - (Y2-MY)\cos(TX1)\} \quad \text{(Exp. 2)}$$

Referring to FIG. 3, in the above expressions Exp.1 and Exp.2, X1 and Y1 represent the position coordinates of the sensor 108, and TX1 represents the angle of sensing direction of the sensor 108 mentioned hereinbefore. Similarly, X2 and Y2 represent the position coordinates of the sensor 109 and TX1 represents the angle of sensing direction thereof. Further, MX and MY represent the position coordinates of the center of rotation of the angular acceleration, RA represents the angular acceleration, and AX and AY represent the translational accelerations in the X- and Y-axis directions, respectively.

Thus, the difference between the accelerations detected by the sensors 108 and 109 and represented by the expressions Exp.1 and Exp.2, respectively, can be determined in accordance with the following expression Exp.3.

$$G1\,A1 \cdot G2\,A2 = (G1-G2)\{AX \cos(TX1) + AY \sin(TX1)\} + G1\,RA\{(X1-MX)\sin(TX1) - (Y1-MY)\cos(TX1)\} + G2\,RA\{(X2-MX)\sin(TX1) - (Y2-MY)\cos(TX1)\} \quad \text{(Exp. 3)}$$

In the above expression Exp.3, G1 and G2 represent the sensitivities of the sensors 108 and 109, respectively. So long as the detection sensitivities G1 and G2 of the two sensors 108 and 109 are equal to each other, the expression Exp.3 can be rewritten as follows:

$$G1\,(A1-A2) = G1\,RA\{(X1-X2)\sin(TX1) - (Y1-Y2)\cos(TX1)\} \quad \text{(Exp. 4)}$$

As is apparent from the above expression Exp.4, only the angular acceleration RA can be derived from the output of the differential amplifier (208) designed for determining the difference between the outputs of the sensors 108 and 109.

Further, the coefficient term of "G1·RA" appearing in the above expression Exp.4 and given by the undermentioned expression Exp.5 represents the inter-sensor distance L3. The difference outputs of the differential amplifier (208) increases in proportion to the inter-sensor distance L3.

$$(X1-X2)\sin(TX1) - (Y1-Y2)\cos(TX1) \quad \text{(Exp. 5)}$$

In general, the detection sensitivities G1 and G2 of the two sensors 108 and 109 differ from each other. Consequently, it is impossible to detect only the angular acceleration RA on the basis of the difference between the outputs of the two sensors 108 and 109. The first term of the right side of the expression Exp.3 indicates that the detection output makes appearance under the influence of the translational accelerations AX and AY. In that case, the detection output is proportional to the dispersion or difference between the sensor sensitivities, i.e., G1−G2. From the second and third terms of the right side of the expression Exp.3, the term concerning the center of rotation can be derived as follows:

$$RA(G2-G1)\{MX \sin(TX1) - MY \cos(TX1)\} \quad \text{(Exp. 6)}$$

More specifically, the above expression Exp.6 represents the distance between the center of rotation and the shock sensor. As can be seen from the expression Exp.6, the difference output of the sensors for the angular acceleration varies in proportional dependence on the distance between the center of rotation and the sensor.

Figure 4:
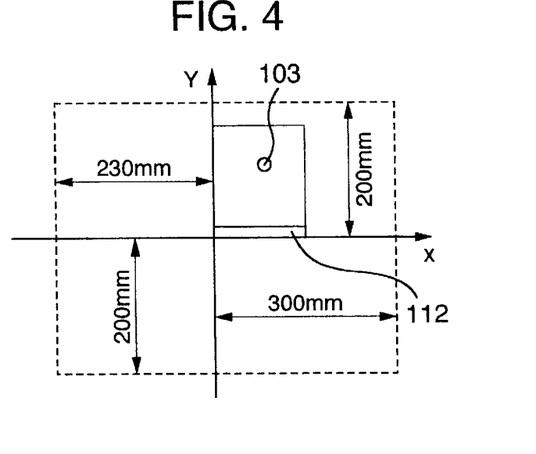
FIG. 4 is a diagram for illustrating a positional relation of the magnetic disk apparatus to a portable-type computer in which the apparatus is installed.

In general, as a machine or apparatus in which the magnetic disk apparatus is destined to be mounted, there may be conceived a portable-type personal computer. In this conjunction, it is noted that the size of the portable personal computer is small and of e.g. A4-size (so-called notebook-size) at maximum. Accordingly, the center of rotation of the angular acceleration applied to the magnetic disk apparatus may be considered to occur within a region indicated as enclosed by a phantom line in FIG. 4.

On the assumption that the inter-sensor distance is not shorter than 10% of the longitudinal side of the oblong box-like casing and not greater than 80% thereof, that the longitudinal side of the magnetic disk apparatus destined for use in the potable computer is about 100 mm and that the dispersion or difference of the sensor detection sensitivity is not greater than 20%, then the angular acceleration not grater than 100 radians (rad) can be detected on the precondition that the center of rotation mentioned above lies within the region shown in FIG. 4.

By disposing or orienting the two shock sensors with an angle relative to the side wall of the box-like casing, as mentioned hereinbefore, it is possible to detect not only the angular acceleration but also the translational acceleration in a plane substantially parallel to the plane of the magnetic disk 103 by using a pair of sensors 108 and 109. By disposing the acceleration sensors for detecting the acceleration in such direction which forms the angle TX1 of 45 degrees relative to the side wall extending perpendicularly to the plane of the magnetic disk 103, the sensitivities of the sensors to the acceleration in the direction which coincides with the extending direction of the above-mentioned side wall can be made equal to each other. In that case, the inter-sensor distance is not greater than about 1.4 times as long as the short side length of the box-like casing of the magnetic disk apparatus.

The angular acceleration can be determined on the basis of the difference between the outputs of the two sensors, as mentioned previously in conjunction with the differential amplifier 208 and the discrimination circuit 210. However, the angular acceleration can also be detected by logically ORing the outputs of the discrimination circuits 211 and 212 provided in association with the sensors 108 and 109 in the output circuit 213 as described hereinbefore in conjunction with the sensor output processing circuit shown in FIG. 5. In this case, it is required to dispose at least a pair of sensors such that a point of intersection of straight lines representing the sensing directions of the two sensors, respectively, is positioned outside of the region covering the center of rotation described previously. When taking into consideration the fact that the magnetic disk apparatus is subjected to the rotational shocks and the rotational vibrations as well, magnitude of the acceleration detected by the sensors will become smaller when the center of rotation is located closer to the straight line representing the sensing direction of the sensor, because the acceleration detected by the sensor is intrinsically the angular acceleration. To say in another way, there exists such an area or region in which the aimed angular acceleration can not be detected.

Such being the circumstances, the present invention teaches that at least two sensors are employed to thereby allow the two sensors to complement mutually the respective sensing functions in the area where the aimed angular acceleration can not be detected, for thereby ensuring the detection of the angular acceleration with enhanced and reliable sensitivity. Of course, the region in which the aimed angular acceleration cannot be detected will nevertheless exist in the vicinity of the point of intersection between the lines representing the sensing directions of the sensors, respectively. However, by disposing the sensors outside of the region mentioned above, it is possible to detect the angular acceleration which takes place in the portable-type personal computer in which the magnetic disk apparatus is employed. Furthermore, by setting the threshold values of the discrimination circuits 211 and 212 provided in association with the sensors 108 and 109 independently from each other, the angular acceleration can be detected with enhanced and reliable sensitivity even in the case where the dispersion or difference of the sensitivities exists between the sensors.

In case the sensors 108 and 109 are disposed distantly from the IC module 201, it is possible to eliminate noise components from the outputs of the sensors 108 and 109 before they are inputted to the IC module 201 by providing the signal conditioning preamplifiers 202 and 203 in association with the sensors 108 and 109 for amplifying the output signals thereof, respectively. The filters 206 and 207 incorporated in the IC module 201 may incorporate low-pass filters, respectively, for preventing the influence of noise by eliminating noise components of high-frequency band. Further, each of the filter circuits 206 and 207 of the IC module 201 may incorporate a notch filter for protecting the sensor output signals from the influences of the resonance frequency of the sensors and noise of specific frequencies contained in the source voltage. Additionally, the filter circuits 206 and 207 of the IC module 201 may each incorporate a high-pass filter for suppressing the influences of low-frequency noise components contained in the sensor outputs, variation or fluctuation and offset components thereof.

In conjunction with interruption or inhibition of the write operation in dependence on the output(s) of the shock sensors 108 and 109, it is necessary to evade such erroneous operation as interruption of the write operation in response to the translational acceleration which is lower than an allowable translational acceleration occurring upon axial movement(s) of a product such as a personal computer mentioned above in which the magnetic disk apparatus according to the invention is mounted. In other words, the write operation inhibit signal for closing a so-called write gate must not be generated upon occurrence of the translational acceleration which is lower than the allowable translational acceleration ensured for the manipulations of the product (portable computer). Accordingly, the threshold value VTH1 has to be set higher than the level of the sensor outputs ascribable to the allowable translational acceleration. In this conjunction, it should be mentioned that setting of the inter-sensor distance in the value range mentioned previously, the output of the filter circuit making appearance in response to the angular acceleration acting on the magnetic disk apparatus can assume a higher level than the threshold level set in the associated discrimination circuit, whereby erroneous detection ascribable to the dispersion or difference of the sensitivities of the shock sensors can be evaded.

It has empirically been established that in the case where the sensors are mounted on a circuit board such as a printed circuit board which in turn is mounted internally of the casing of the magnetic disk apparatus, the acceleration applied in the direction perpendicular to the plane of the magnetic disk 103 and detected by the sensor will amount to about twice as high as the acceleration applied to the box-like casing at maximum because of vibration of the circuit board. Magnitude of the acceleration which makes appearance in the vertical direction upon manipulation of the portable computer equipped with the magnetic disk apparatus such as input operation with a keyboard, manipulation of a mouse pad or the like is generally smaller than 10 G inclusive. In this conjunction, it is noted that the magnetic head is not caused to move out of the alignment with the target track. Accordingly, the write operation inhibit signal should not be generated by the IC module under the influence of the vertical acceleration on the order of 10 G. By selecting the angle TZ to be smaller than 10 degrees inclusive, as described hereinbefore, magnitude of the acceleration of the direction perpendicular to the disk plane which can be detected by the shock sensors 108 and 109 is small when compared with the acceleration of the direction parallel to the disk plane. Thus, with the acceleration detecting arrangement taught by the present invention, erroneous detection of the acceleration as well as erroneous generation of the write operation inhibit signal due to the vibration of the circuit board and manipulation of equipment such as the keyboard, mouse pad or the like can be avoided with high reliability.

In a mode for carrying out the present invention, the dispersion or difference of the sensor sensitivity can correctively be compensation for by adopting such arrangement which allows the amplification factor of the input amplifier 204; 205 to be changed or altered. A method of compensating for dispersion or deviation of the sensor sensitivity will be described below. In a first step, a translational acceleration is applied to the box-like casing 101 or a circuit board 303. In that case, the translational acceleration as applied is so set as to be of sinusoidal half-wave or sinusoidal full-wave having a relatively large amplitude such as shock-ascribable translational acceleration in order to evade the influence of noise components. The outputs of the two shock sensors 108 and 109 upon application of the acceleration are measured. Subsequently, the maximum value of the sensor output is determined in the case where the translational acceleration is of sinusoidal half-wave, while in the case where the translational acceleration is of sinusoidal full-wave an integrated value and/or amplitude of the sensor output is arithmetically determined after the full wave rectification of the sensor output. In a second step, the ratio between the outputs of the shock sensors 108 and 109 is determined. In a third step, the amplification factors of the input amplifiers 204 and 205 are so selected that the ratio between the amplification factors of the input amplifiers 204 and 205 as well as the signal conditioning preamplifiers 202 and 203, if provided, can assume a value equal to or approximating the reciprocal of the output ratio mentioned above.

Next, another embodiment of the present invention will be described by reference to FIG. 8 which shows schematically a magnetic disk apparatus in a partially exploded perspective view.

Figure 8:
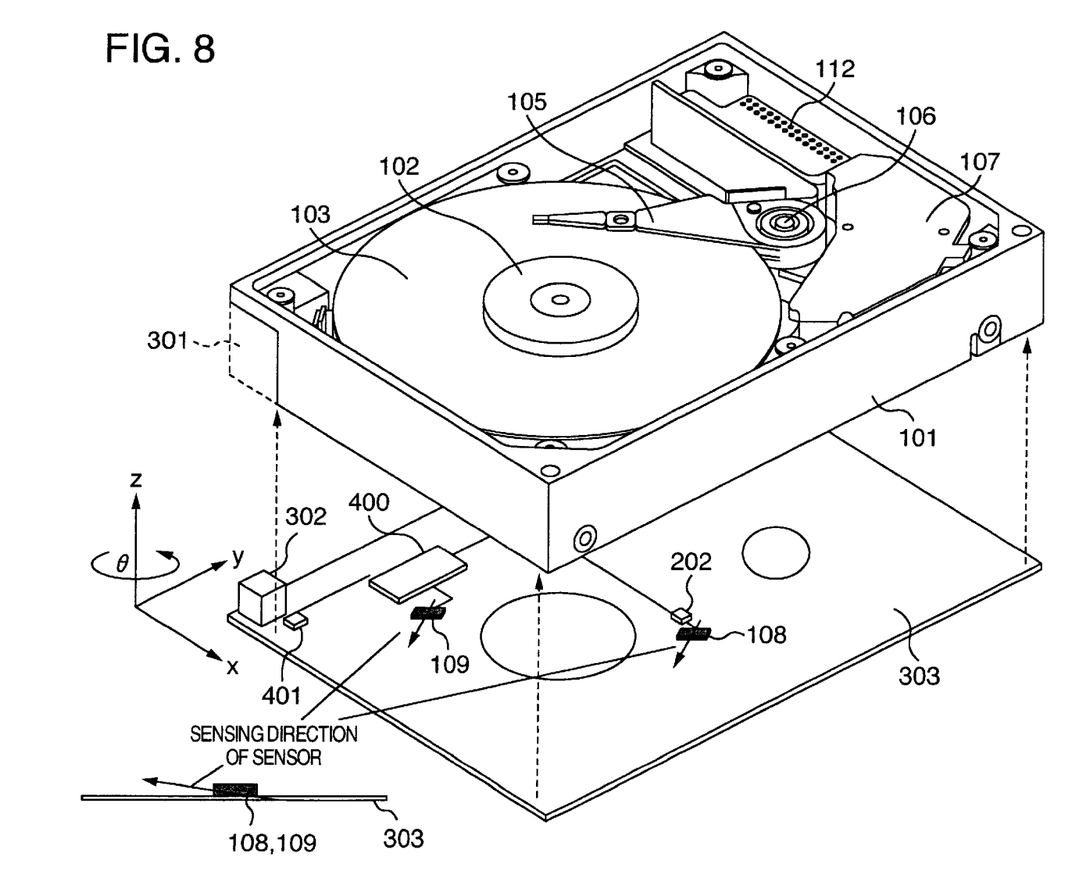
FIG. 8 is a partially exploded perspective view showing schematically a magnetic disk apparatus according to another embodiment of the present invention.

Referring to FIG. 8, a recess 301 is formed at an outer corner portion of the box-like casing 101 for receiving therein a gyro-sensor mounted on the box-like casing. A vibration-type gyro-sensor 302 designed for detecting an angular velocity is mounted on a circuit board 303 such as a printed circuit board at a position corresponding to the recess 301 formed in the circuit board 303. Further mounted on the circuit board are a pair of shock sensors 108 and 109 adapted for detecting the accelerations in the two directions extending discretely and in parallel to each other. Additionally, there is mounted on the circuit board 303 an IC module 400 for processing the output signals inputted from the shock sensors 108 and 109 for thereby producing the write operation inhibit signal. Parenthetically, the IC module 400 mounted on the circuit board 303 may be so arranged as to perform other functions such as spindle control and other control functions for the magnetic disk apparatus. The pair of shock sensors 108 and 109 should preferably be disposed with a distance therebetween which is selected to be as long as possible in order to enhance the acceleration detection sensitivity.

Since the sensing direction of the shock sensors is oriented at an angle of 5 degrees or so relative to the plane of the magnetic disk, it is possible to detect the shocks and vibrations in the Z-direction in addition to the rotational disturbances.

Figure 9:
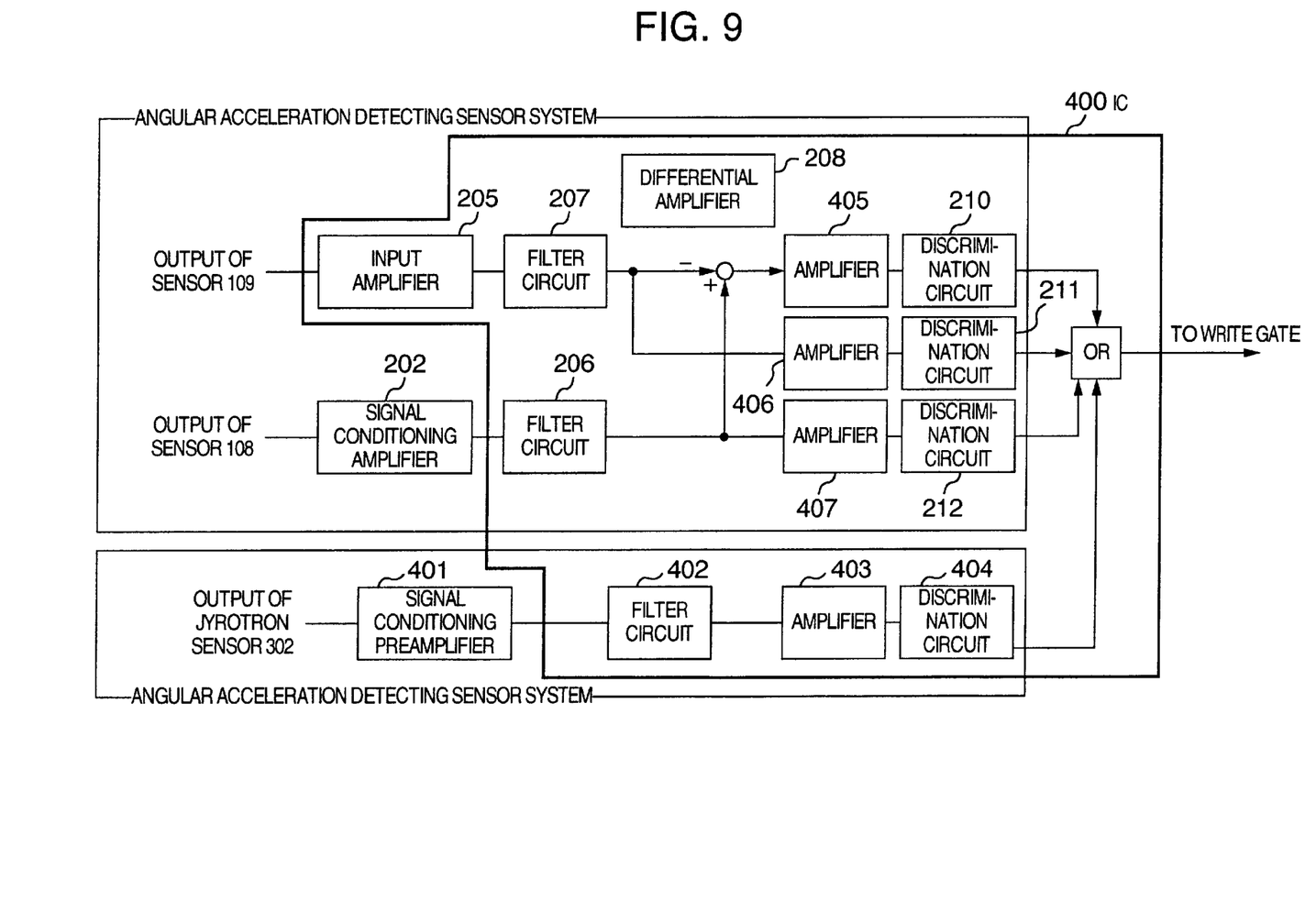
FIG. 9 is a block diagram showing schematically an arrangement of the sensor output processing circuit according to another embodiment of the present invention.

FIG. 9 is a block diagram showing schematically an arrangement of the sensor output processing circuit according to the instant embodiment of the present invention. The sensor output processing circuit now under consideration differs from the sensor signal processing circuit shown in FIG. 5 in that the angular velocity detecting system including the vibration-type gyro-sensor in addition to the angular acceleration detecting sensor system and that the signal processing system provided in succession to the sensors is implemented in the form of an integrated circuit or IC for miniaturization of the shock/vibration detecting system. Inherently, the output of the shock sensor is feeble and susceptible to the influence of noise and others. Accordingly, it is indispensable to amplify previously the sensor output signals in precedence to the processing thereof. In the case of the magnetic disk apparatus according to the instant embodiment of the invention, the shock sensor 109 is provided at a position in the vicinity of the IC module 400. Accordingly, such arrangement is adopted that the output signal of the shock sensor 109 is amplified by the input amplifier 205 which is incorporated in the IC module 400 (see FIGS. 5 and 6 as well). However, the signal conditioning preamplifier 401 for the shock sensor 108 and the preamplifier 202 for the gyro-sensor 302 are disposed outside of the IC module 400. By virtue of this arrangement, the shock/vibration detecting system can be implemented in a small-sized structure.

Thus, the IC module 400 now under consideration is comprised of the acceleration detecting system and the angular velocity detecting system, wherein the acceleration detecting system includes the signal conditioning preamplifier 202, input amplifier 205, filter circuits 206 and 207, a differential amplifier 208, amplifiers 405, 406, 407 and 403 and discrimination circuits 210, 211 and 212, while the angular velocity detecting system includes a signal conditioning preamplifier 401, a filter circuit 402, an amplifier 403 and a discrimination circuit 404. The outputs of the discrimination circuits 210, 211, 212 and 404 are inputted to the logical OR circuit 213B serving as the output circuit of the signal processing IC module. In the acceleration detecting system, the input amplifier 205 is designed to amplify the output signal of the sensor 109 such that the acceleration sensitivities of the sensor circuitries constituted by the sensor 108 on one hand and the sensor 109 inclusive of the signal conditioning preamplifier 202 on the other hand are equal to each other. The amplification factor of the input amplifier 205 is adjustable and thus so selected that dispersion or difference of the detection sensitivities of the sensors 108 and 109 as well as the deviation of the amplification factor of the signal conditioning preamplifier 202 can correctively be canceled out. The sensor output signals amplified by the input amplifier 205 and the signal conditioning preamplifiers 202, respectively, are supplied to the filter circuits 206 and 207 (each of which may include a notch filter, a high-pass filter, a low-pass filter and/or a band-pass filter), whereby noise components as well as DC offset components are eliminated from the sensor output signals by the filter circuits 206 and 207, respectively. At this juncture, it is to be mentioned that the signal conditioning preamplifier 202 and/or the input amplifier 205 may intrinsically exhibit some filter characteristics such as of the high-pass filter or the like. Accordingly, in practical applications, the characteristics of the filter circuits 206 and 207 should preferably be determined by taking into account the characteristics of the input amplifier 205 and the signal conditioning preamplifier 202. The output signals of the filter circuits 206 and 207 are inputted to the differential amplifier 208 which is designed to detect difference between the output signals of the filter circuitries 206 and 207.

The difference signal outputted from the differential amplifier 208 is supplied to the discrimination circuit 210 by way of the amplifier 405. In this conjunction, the output signal of the differential amplifier 208 may be made to pass through a filter such as a high-pass filter and/or a band-pass filter (not shown) for cutting off the frequency components of low frequency band. When the absolute value of the difference signal outputted from the differential amplifier 208 exceeds a given value or threshold level VTH1 exceeds in the discrimination circuit 210, the signal for closing the write gate is emitted from the output circuit 213B of the IC module 400. Further, the output signals of the filter circuits 206 and 207 are inputted directly to the discrimination circuits 211 and 212 by way of the amplifiers 406 and 407, respectively and the write gate closing signal (write operation inhibit signal) is generated when the absolute value of the sensor output exceeds the threshold value VTH2.

Similarly, in the angular velocity detecting system, the output of the gyro-sensor is inputted to the IC module 400 after having been amplified by the signal conditioning preamplifier 401. The output signal of the signal conditioning preamplifier 401 is then inputted to the filter circuit 402 (which may include a notch filter, a high-pass filter, a low-pass filter and/or a band-pass filter), whereby noise components as well as DC offset components are eliminated from the sensor output signal by the filter circuit 402. The output signal of the filter circuit 402 is supplied to the discrimination circuit 404 by way of the amplifier 403. When the absolute value of the signal inputted from the amplifier 403 exceeds a preset threshold value VTH4, a signal indicating the write operation inhibit signal for closing the write gate is produced by the discrimination circuit 212 and sent out through the output circuit 213B which is imparted with the OR function. In this conjunction, the threshold levels for the discrimination circuits 210, 211, 212 and 404 may be set appropriately independently of one another or alternatively a same threshold level may be set in all the discrimination circuits 210, 211, 212 and 404 and the amplification factors of the amplifier circuitries preceding to these discrimination circuits may be selected properly for realizing the substantially same action and effect as the setting of the threshold levels proper to the discrimination circuits, respectively. As mentioned previously, the output circuit 213B is designed for logically ORing the output signal of the discrimination circuit 210 provided in association with the differential amplifier 208 for both the shock sensors 108 and 109, the output signals of the discrimination circuits 211 and 212 provided in association with the shock sensors 108 and 109, respectively, and the output signal of the gyro-sensor 302, to thereby produce a signal for inhibiting or interrupting the write operation of the magnetic disk apparatus whenever the logical OR condition is satisfied by any one of the output signals mentioned above. By incorporating the gyro-sensor system in the shock/vibration detecting system for the magnetic disk apparatus as described above, the shock/vibration of small magnitude can be detected, whereby the operation reliability of the shock/vibration detecting system can be enhanced.

Figure 10:
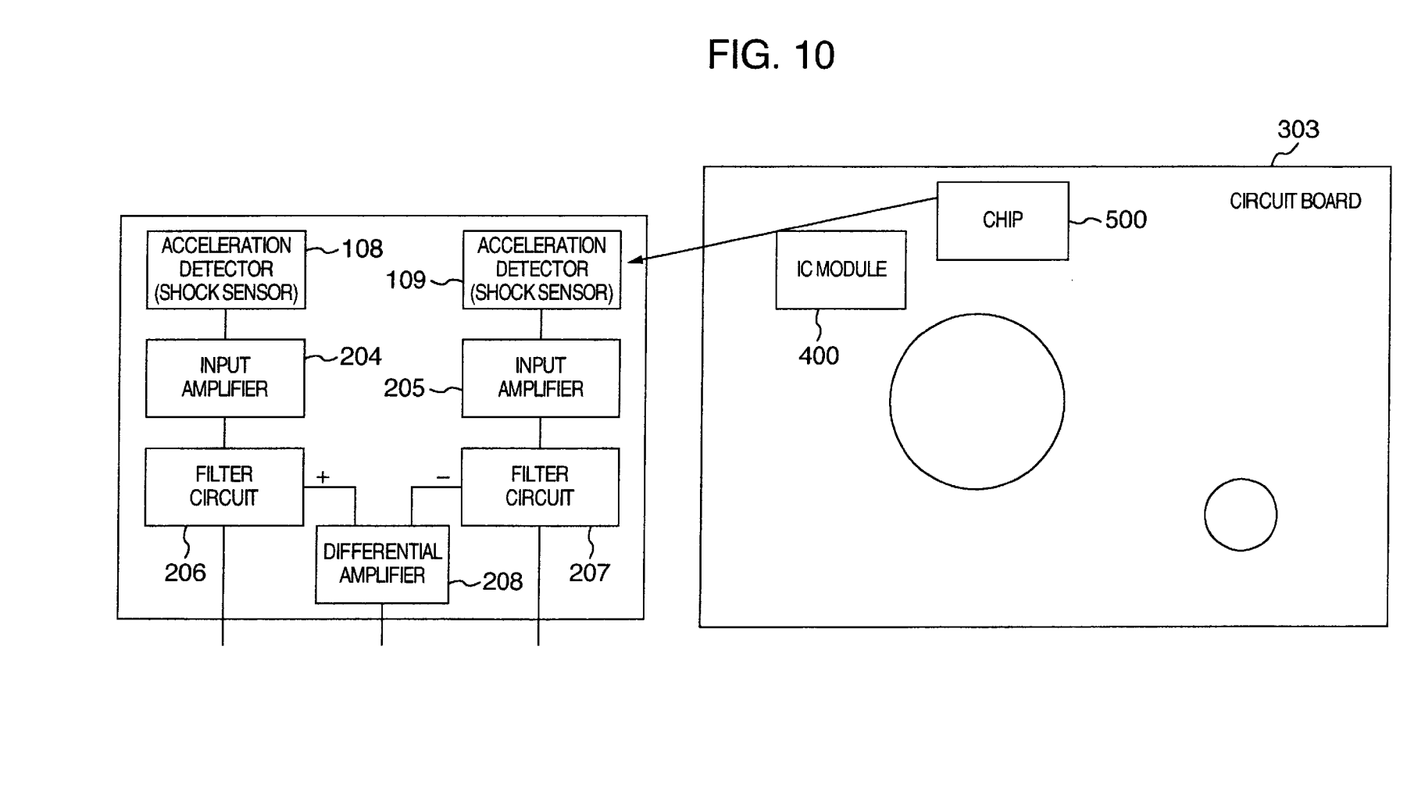
FIG. 10 is a view showing only schematically a magnetic disk apparatus according to another embodiment of the present invention.

FIG. 10 is a view showing only schematically a magnetic disk apparatus according to another embodiment of the present invention. In the magnetic disk apparatus now under consideration, the acceleration detecting sensors designed for detecting the accelerations in two directions extending discretely in parallel to each other are incorporated in a single IC chip 500. In FIG. 10, reference numeral 108 and 109 denote shock sensors, respectively, 204 and 205 denote input amplifiers, respectively, 206 and 207 denote filter circuits, respectively, and 208 denotes a differential amplifier. With a view to enhancing the detection sensitivity for the angular acceleration, the two sensors are disposed in the IC chip 500 with a distance therebetween. In this conjunction, it is noted that angular acceleration of small magnitude can be detected by the gyro-sensor (not shown in FIG. 10). Accordingly, the shock sensors 108 and 109 are required to detect the angular acceleration of large magnitude with high response rate, which can be realized even when the shock sensors are incorporated in the IC chip together with the associated circuits. Owing to this structure, noise, dispersion of sensitivities and the like can be reduced as well, to another advantage.

Figure 11:
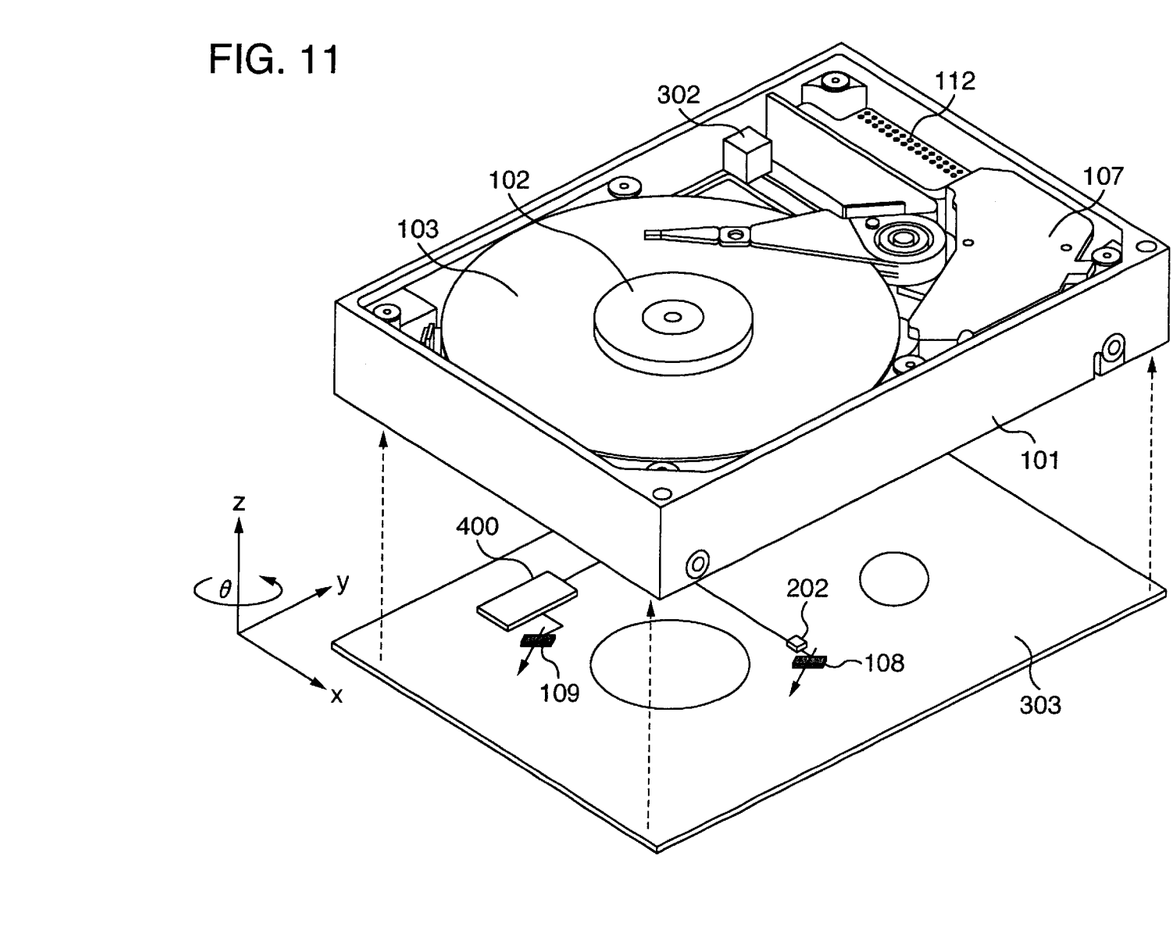
FIG. 11 is a partially developed perspective view showing a magnetic disk apparatus according to a further embodiment of the present invention.

FIG. 11 shows in a partially developed perspective view a magnetic disk apparatus according to a further embodiment of the present invention. In the magnetic disk apparatus according to the instant embodiment of the invention, the gyro-sensor 302 is mounted internally of the box-like casing 101, the output of the gyro-sensor 302 being inputted to the IC module 400 mounted on the circuit board 303. By virtue of this arrangement, the necessity of providing the recess 301 (see FIG. 8) in the box-like casing 101 can be eliminated, which contributes to simplification and facilitation of implementation of the invention.

With the structures of the shock/vibration detecting system for the magnetic disk apparatus according to the present invention in which the angular acceleration detecting sensors are employed, preferably in combination with the angular velocity detecting sensor, rotational disturbance applied to the magnetic disk apparatus under the influence of shock and rotational vibration can be detected with high reliability, whereby destruction of data and the like unwanted events due to the off-track operation of the magnetic head can be prevented. Thus, there has been provided a magnetic disk apparatus in which the positioning control for placing the magnetic head at a predetermined position by the rotational driving mechanism can be carried out with high security and reliability.

In the foregoing, the present invention has been described in conjunction with the magnetic disk apparatuses. It should however be understood that the present invention is never restricted to the magnetic disk apparatus. As can readily be appreciated by those having ordinary knowledge in the art, the present invention is never restricted to the magnetic disk apparatus but can find application to other types of information/data recording disk apparatuses such as DVD (digital versatile disk), CD-R (compact disk recordable) and the like disk apparatuses. Further, since numerous modifications and combinations will readily occur to those skilled in the art, it is not intended to limit the invention to the exact construction and operation illustrated and described. Accordingly, all suitable modifications and equivalents may be resorted to, falling within the spirit and scope of the invention.

What is claimed is:

1. An information recording disk apparatus, comprising:
at least an information recording disk for recording information;
at least a read/write head for writing/reading the information on/from said information recording disk;
a head supporting arm assembly for supporting said read/write head;
a pivot shaft for supporting pivotally said head supporting arm assembly;
an actuator for driving said head supporting arm assembly; and
at least a pair of acceleration detectors for detecting acceleration in two directions extending discretely in parallel to each other,
wherein respective ones of said pair of acceleration detectors is disposed on a circuit board at positions proximate to said information recording disk relative to said pivot shaft as viewed in a longitudinal direction of a box-like casing of said information recording disk apparatus so that a rotation center of said information recording disk is disposed between said pair of acceleration detectors, and said pair of acceleration detectors is disposed on a line which extends through the rotation center and is perpendicular to a rotation axis of said information recording disk.

2. An information recording disk apparatus according to claim 1,
wherein said pair of acceleration detectors are disposed on said circuit board which is mounted internally of said box-like casing.

3. An information recording disk apparatus according to claim 1, wherein preamplifiers of said pair of acceleration detectors are disposed on said circuit board at positions proximate to said information recording disk relative to said pivot shaft as viewed in a longitudinal direction of said box-like casing of said information recording disk apparatus and in accordance with the positions of said pair of said acceleration detectors.

4. An information recording disk apparatus according to claim 1, wherein a processing circuit for said pair of acceleration detectors is disposed on said circuit board at positions proximate to said information recording disk relative to said pivot shaft as viewed in a longitudinal direction of said box-like casing of said information recording disk apparatus and in accordance with the positions of said pair of said acceleration detectors.

5. An information recording disk apparatus according to claim 1, further comprising a discrimination circuit for comparing an output of the pair of acceleration detectors with a predetermined value and for generating a signal for inhibiting a writing operation on said information recording disk by said at least a read/write head in accordance when the predetermined value is exceeded.

6. An information recording disk apparatus, comprising:
at least an information recording disk for recording information;
at least a read/write head for writing/reading information on/from said information recording disk;
a head supporting arm assembly for supporting said read/write head;

an actuator for driving said head supporting arm assembly; and at least a pair of acceleration detectors for detecting acceleration in two directions extending discretely in parallel to each other, and respective ones of said pair of acceleration detectors being arranged so that a rotation center of said information recording disk is disposed between said pair of acceleration detectors, and said pair of acceleration detectors is disposed on a line which extends through the rotation center and is perpendicular to a rotation axis of said information recording disk, wherein distance between straight lines indicating direction of the acceleration detected by said pair of acceleration detectors, respectively, is not more than 80% of the longitudinal length of a box-like casing of said information recording disk.

7. An information recording disk apparatus, comprising:

at least an information recording disk for recording information;

at least a read/write head for writing/reading information on/from said information recording disk;

a head supporting arm assembly for supporting said read/write head;

an actuator for driving said head supporting arm assembly; and at least one acceleration detector mounted on a box-like casing of said information recording disk apparatus for detecting acceleration in a plane which forms an angle of not greater than 10 degrees and not zero relative to a plane extending in parallel to the plane of said information recording disk.

8. An information recording disk apparatus according to claim 7, wherein said acceleration detectors are disposed fixedly on a circuit board which is mounted on said box-like casing.

* * * * *